Figure 1:
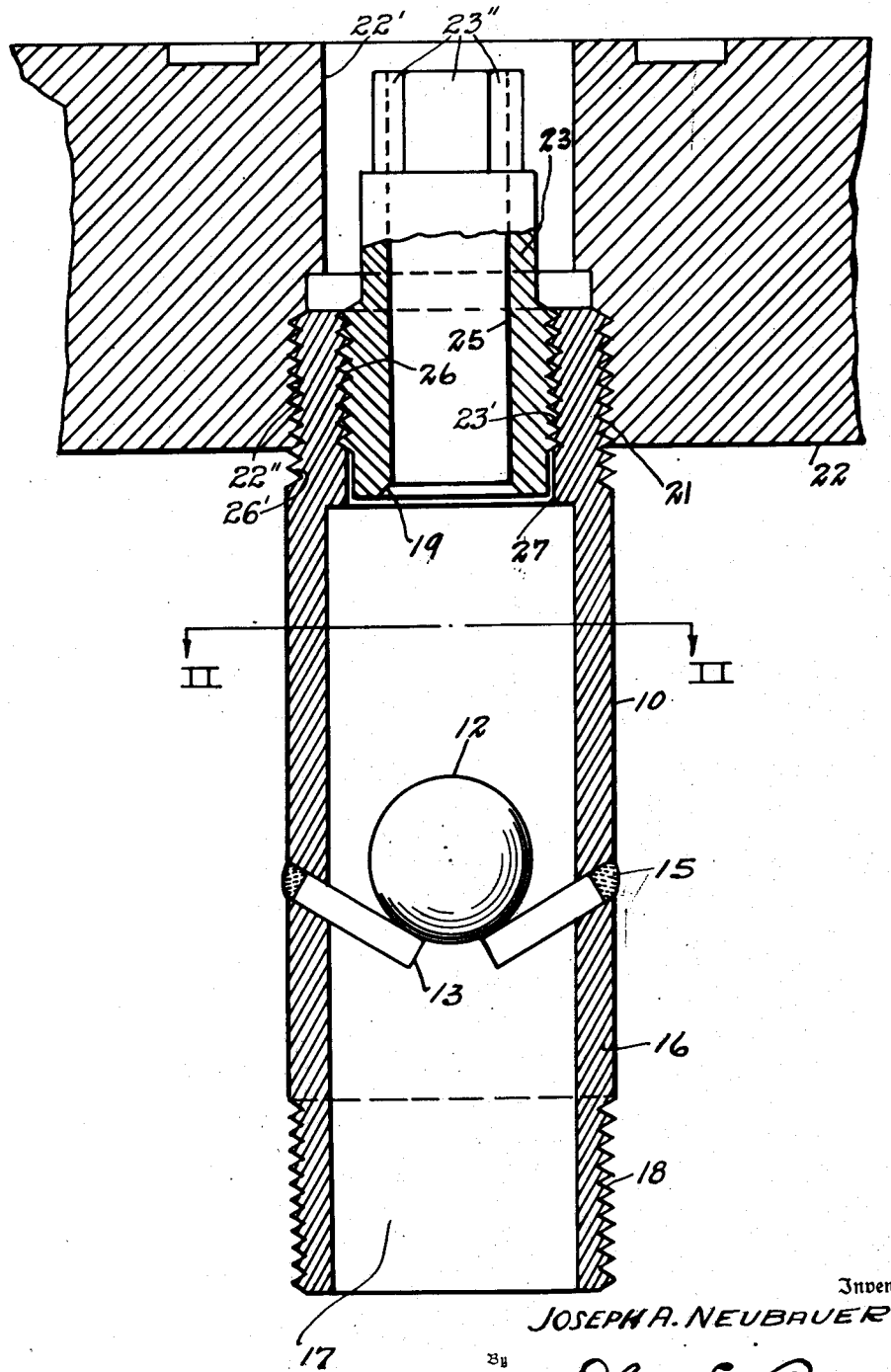

Oct. 28, 1952

J. A. NEUBAUER 2,615,676

EXCESS FLOW CHECK VALVE

Filed Sept. 25, 1948

2 SHEETS—SHEET 1

Inventor
JOSEPH A. NEUBAUER
By
Olen E. Bee
Attorney

Oct. 28, 1952     J. A. NEUBAUER     2,615,676
EXCESS FLOW CHECK VALVE

Filed Sept. 25, 1948     2 SHEETS—SHEET 2

INVENTOR
JOSEPH A. NEUBAUER

BY Olen E. Bee
ATTORNEY.

Patented Oct. 28, 1952

2,615,676

UNITED STATES PATENT OFFICE 2,615,676

EXCESS FLOW CHECK VALVE

Joseph A. Neubauer, Pittsburgh, Pa., assignor, by mesne assignments, to Columbia-Southern Chemical Corporation, Pittsburgh, Pa., a corporation of Delaware Application September 25, 1948, Serial No. 51,280

1 Claim. (Cl. 251—121)

This invention relates to an excess flow check valve and it has particular relation to a novel type of an excess flow check valve which provides for ready inspection and maintenance of the interior of the valve.

One object of the invention is to provide an excess flow check valve installation employing a ball as the checking member with a removable top which will permit cleaning or replacement of the ball and inspection of the interior of the valve structure.

This and other objects of the invention will be apparent from consideration of the following specification and appended claim.

In chemical process equipment and other industrial equipment and installations, it is frequently necessary to remove units, such as valve elements, for inspection and cleaning. This often entails inconvenience in dismantling the equipment, and loss of time involved in restoring the unit desired to proper operative condition. Previously, it has been a most difficult and tedious task to inspect and clean the interior of excess flow check valve installations of the type herein described, and to inspect the ball or replace it.

In the conventionally used tank car installations the upper portion of such valve is removably connected to the lower portion of a manway cover which is rigidly connected to the tank body. Consequently, it has been necessary to remove the manway cover to gain access to the ball or interior of the excess flow check valve.

According to the present invention, a valve installation has been provided into which access may be gained in a simple manner and without recourse to the tedious and laborious operations required in dealing with prior installations. In one form of the invention, an excess flow check valve is provided which will aid in inspection and cleaning of the valve element in a tank car installation without necessitating removal of the manway cover to obtain the valve installation with which it is used. The top of the valve is fitted with a closure member which is screwthreaded thereinto, or otherwise removably fitted thereto, which member permits passage of fluid, but will not permit passage of the ball. However, when this member is detached, the opening in the valve is large enough to then permit passage of the ball.

Figure 2:
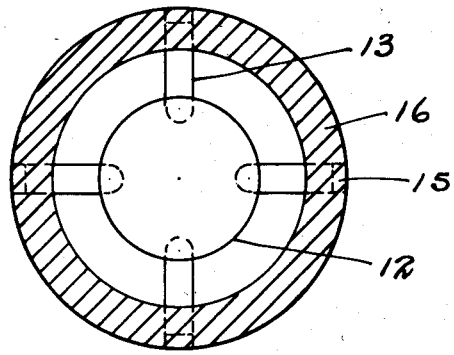
Figure 3:
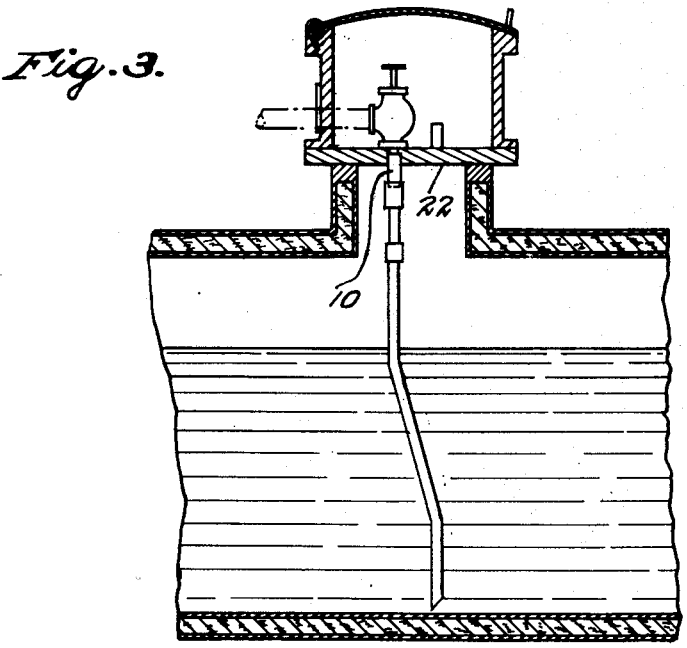

For a better understanding of the invention, reference may now be made to the accompanying drawings wherein:

Fig. 1 is a view, partially in vertical section and partially in elevation of the valve installation; Fig. 2 is a horizontal section taken substantially along the line II—II of Fig. 1; and Fig. 3 is a view partially in vertical section and partially in elevation of the valve installation in a tank car.

Referring to the drawings, a check valve structure 10 is shown in which a ball 12 operates in a conventional manner in respect to fluid flow. When there is no fluid flowing through the valve, the ball 12 rests upon pins 13 which are mounted as indicated at 15 in the housing 16 of the valve structure. As the fluid begins to flow into the valve at 17 the pressure of the flow lifts the ball to a height proportional to the velocity of the flow. As the pressure reaches a predesigned maximum, the ball will be forced against a bevelled valve seat 19 and the valve is then in closed position. It will remain closed as long as the pressure is maintained, but will gradually return to open position on the pins 13 as the pressure is decreased.

The valve housing 16 is formed with a screwthreaded exterior portion 21 at its upper outlet end which is adapted to be connected to a manway cover 22. Manway cover 22 is formed with an aperture 22' extending vertically therethrough which is threaded at its lower portion 22" to receive the exteriorly threaded upper outlet end 26' of the valve housing 16. Valve housing 16 is an elongated tubular member which is also exteriorly threaded at its inlet end at 18. A removable tubular top 23, having a passage 25 therethrough and a threaded exterior end portion 23' is screwed into the valve interiorly threaded housing at 26. The removable tubular top 23 is elongated and its end opposite to its exterior threaded end portion 23' is formed as a reduced portion consisting of polygonal sides as at 23". These sides 23" serve to receive a wrench for threadedly inserting and removing the tubular top 23. The diameter of the passage 25 is large enough to permit the flow of fluid through it, but is not large enough to permit passage of the ball 12. However, the diameter of the opening 27, into which the top 23 is screwed, is large enough to permit removal of the ball for inspection, cleaning, replacement or for other purposes when the top 23 is removed.

From the foregoing description, it will be apparent that the interior of the valve structure is conveniently accessible to permit removal and cleaning of the ball 12, as well as to permit cleaning or inspection of the interior portions of the housing 16 without requiring that the manway cover be removed to obtain the valve.

Although structure illustrative of the invention has been shown and described in detail, it will be apparent, to those skilled in the art, that the invention is not so limited but that various changes can be made therein without departing from the spirit of the invention or from the scope of the appended claim.

I claim:

An excess flow check valve for mounting in a vertically extending aperture in a manway cover of a tank car wherein the aperture has a threaded lower portion, comprising, in combination, an elongated tubular valve housing having a passage therethrough with an inlet end and an outlet end, an exteriorly threaded outer portion at each end, an interiorly threaded portion at its upper end, said exteriorly threaded upper portion being threadedly received in said threaded portion of the aperture in the manway cover thereby positioning said tubular valve housing in a vertical position, four pins mounted in said housing at equal spacing about a horizontal plane passing through the housing at approximately midway between the ends thereof, said pins extending inwardly from the housing interior at an angle of 90° to each other and downwardly at an angle from said horizontal plane, a ball valve member of a diameter substantially less than the interior diameter of said tubular valve housing adapted to be inserted in and removed from said interior threaded end of the tubular housing and resting on said inwardly and downwardly extending pins in a position of rest, and an elongated tubular member having an internal diameter less than the diameter of said ball valve member and a threaded exterior portion adjacent one end screwed into the threaded interior end of said tubular valve housing, the opposite end from said threaded exterior portion of the tubular member having a reduced exterior end portion consisting of polygonal sides for receiving a wrench means for threadedly inserting and removing said elongated tubular member in the tubular valve housing permitting removal of said ball member and access to the interior of the valve housing and tubular member for inspection and cleaning, said tubular member being provided with an annular beveled faced seat adjacent the threaded end portion against which said ball valve member seats when moved into engagement thereagainst by fluid flowing through the passage formed by the valve housing and the elongated tubular member thereby checking the flow of fluid through said passage.

JOSEPH A. NEUBAUER.

REFERENCES CITED

The following references are of record in the file of this patent:

UNITED STATES PATENTS

| Number | Name | Date |
|---|---|---|
| 387,961 | Ryan | Aug. 14, 1888 |
| 1,279,599 | Slaughter | Sept. 24, 1918 |
| 1,292,988 | Bacon | Feb. 4, 1919 |
| 1,388,602 | Rotteleur | Aug. 23, 1921 |
| 1,490,848 | Pettit | Apr. 15, 1924 |
| 1,820,138 | Hargis | Aug. 25, 1931 |
| 1,882,314 | Burt | Oct. 11, 1932 |

FOREIGN PATENTS

| Number | Country | Date |
|---|---|---|
| 4,191 | England | 1909 |
| 804,620 | France | 1936 |
| 905,730 | France | 1945 |